United States Patent
Eriksson et al.

(10) Patent No.: US 12,332,009 B2
(45) Date of Patent: Jun. 17, 2025

(54) ARRANGEMENT OF AN ELEVATION DEVICE FOR A VEHICLE MOUNTED WEAPON SYSTEM

(71) Applicant: BAE SYSTEMS HÄGGLUNDS AKTIEBOLAG, Örnsköldsvik (SE)

(72) Inventors: Claes Eriksson, Arnäsvall (SE); Johnny Grenwald, Sidensjö (SE)

(73) Assignee: BAE SYSTEMS HÄGGLUNDS AKTIEBOLAG, Örnsköldsvik (SE)

(*) Notice: Subject to any disclaimer, the term of this patent is extended or adjusted under 35 U.S.C. 154(b) by 115 days.

(21) Appl. No.: 18/547,863

(22) PCT Filed: Feb. 25, 2022

(86) PCT No.: PCT/SE2022/050197
§ 371 (c)(1),
(2) Date: Aug. 24, 2023

(87) PCT Pub. No.: WO2022/182282
PCT Pub. Date: Sep. 1, 2022

(65) Prior Publication Data
US 2024/0151487 A1    May 9, 2024

(30) Foreign Application Priority Data
Feb. 26, 2021  (SE) .................... 2150205-9

(51) Int. Cl.
*F41A 27/16* (2006.01)
*F41A 9/57* (2006.01)
*B62D 55/06* (2006.01)

(52) U.S. Cl.
CPC ............ *F41A 27/16* (2013.01); *F41A 9/57* (2013.01); *B62D 55/06* (2013.01)

(58) Field of Classification Search
CPC .......... F41A 23/24; F41A 27/16; F41A 27/18; F41A 9/57
See application file for complete search history.

(56) References Cited

U.S. PATENT DOCUMENTS 2,004,856 A * 6/1935 Daum ............... F41A 9/14
                                                                   89/45
2,062,212 A * 11/1936 Daum ............... F41A 9/14
                                                                   89/45

(Continued)

FOREIGN PATENT DOCUMENTS

CH        419905 A      8/1966
DE    10123835 A1    11/2002

(Continued)

OTHER PUBLICATIONS

Extended European Search Report dated Dec. 16, 2024, Directed to EP Application No. 22760148.1; 7 pages.

(Continued)

*Primary Examiner* — Joshua E Freeman
(74) *Attorney, Agent, or Firm* — Morrison & Foerster LLP

(57) ABSTRACT

The present invention relates to an arrangement for an elevation device of a vehicle mounted weapon system. The weapon system comprise a weapon and a feeding chute. Said elevation device is arranged to allow elevation movement of the weapon about an elevation axis. Said elevation is performed in connection to sides of said elevation device about said elevation axis. Said feeding chute is configured to be arranged in connection to one side. Said arrangement comprises an arc-shaped sector bearing device of a bearing configuration for facilitating said elevation. Said bearing device is arranged in connection to a front portion at said one side at a radial distance from said elevation axis so as to provide space for said feeding chute on said one side in (Continued)

connection to said elevation axis. The invention also relates to a vehicle with an arrangement according to the present invention.

19 Claims, 9 Drawing Sheets

(56) References Cited

U.S. PATENT DOCUMENTS

| | | | | |
|---|---|---|---|---|
| 2,441,218 | A * | 5/1948 | Bialek | F41A 33/00 89/45 |
| 2,520,736 | A * | 8/1950 | Reek | F41A 23/24 89/37.16 |
| 3,820,436 | A * | 6/1974 | Kohler | F41A 27/22 89/36.13 |
| 3,847,053 | A * | 11/1974 | Ubelacker | F41H 5/20 89/36.13 |
| 3,854,377 | A * | 12/1974 | Schiele | F41A 27/08 89/36.13 |
| 4,381,693 | A * | 5/1983 | Dumez | F41A 23/24 89/46 |
| 4,574,683 | A * | 3/1986 | LeBlanc | F41A 9/54 89/34 |
| 5,076,138 | A * | 12/1991 | Mannhart | F41A 9/04 89/34 |
| 5,285,714 | A * | 2/1994 | Sprafke | F41H 5/223 89/36.13 |
| 5,864,085 | A * | 1/1999 | Begneu | F41A 27/08 89/37.07 |
| 6,701,821 | B2 * | 3/2004 | Lundqvist | F41A 23/24 89/37.03 |
| 10,415,908 | B1 * | 9/2019 | Suk | F41A 9/29 |
| 2003/0051599 | A1 * | 3/2003 | Lundqvist | F41A 27/18 89/37.03 |
| 2015/0082977 | A1 * | 3/2015 | Tikochinski | F41H 5/20 89/41.01 |
| 2016/0025435 | A1 * | 1/2016 | Lung | F41A 9/57 89/37.15 |
| 2016/0258704 | A1 * | 9/2016 | Hobson | F41A 27/28 |
| 2018/0252490 | A1 * | 9/2018 | Lung | F41A 27/28 |
| 2019/0264996 | A1 * | 8/2019 | Baert | F41A 23/24 |

FOREIGN PATENT DOCUMENTS

| | | |
|---|---|---|
| GB | 537786 A | 7/1941 |
| GB | 1019430 A | 2/1966 |
| GB | 1157234 A | 7/1969 |
| SE | 1951170 A1 | 4/2021 |
| WO | 2021/002793 A1 | 1/2021 |

OTHER PUBLICATIONS

International Search Report and Written Opinion mailed Apr. 8, 2022, directed to International Application No. PCT/SE2022/050197; 15 pages.

Office Action dated Apr. 17, 2023, directed to Swedish Application No. 2150205-9; 4 pages.

Office Action dated Apr. 7, 2022, directed to Swedish Application No. 2150205-9; 5 pages.

Office Action dated Oct. 18, 2021, directed to Swedish Application No. 2150205-9; 9 pages.

* cited by examiner

ARRANGEMENT OF AN ELEVATION DEVICE FOR A VEHICLE MOUNTED WEAPON SYSTEM

CROSS-REFERENCE TO RELATED APPLICATIONS

This application is a U.S. national stage application under 35 U.S.C. § 371 of International Application No. PCT/SE2022/050197, filed Feb. 25, 2022, which claims the priority of SE Application No. 2150205-9, filed Feb. 26, 2021, the entire contents of each priority application is incorporated herein by reference.

FIELD OF THE DISCLOSURE

The present invention relates to an arrangement of an elevation device for a vehicle mounted weapon system.

The present invention also relates to a vehicle.

BACKGROUND OF THE DISCLOSURE

Combat vehicles such as infantry fighting vehicles or tanks may be equipped with a weapon system associated with a turret, wherein the weapon system comprises a weapon attached to the turret. The ammunition is normally configured to be fed to the weapon from an ammunition magazine via some kind of feeding chute. Such weapon systems are provided with an elevation device arranged to allow elevation movement of the gun barrel about an elevation axis. Such an elevation device comprises a bearing configuration for facilitating said elevation of said weapon about the elevation axis.

Space and arrangement of weapon in connection to elevation device for weapon systems may be an issue, e.g. for weapon systems associated with a turret configured to house parts of the weapon system including feeding chutes requiring certain space.

There is thus a need to provide an arrangement of an elevation device for a vehicle mounted weapon system facilitating space and arrangement of weapon of the weapon system.

OBJECTS OF THE INVENTION

An object of the present invention is to provide an arrangement of an elevation device for a vehicle mounted weapon system, which facilitates space and arrangement of weapon of the weapon system.

Another object of the present invention is to provide a vehicle comprising such an arrangement.

SUMMARY OF THE DISCLOSURE

These and other objects, apparent from the following description, are achieved by an arrangement of an elevation device for a vehicle mounted weapon system and a vehicle as set out in the appended independent claims. Preferred embodiments of the arrangement are defined in appended dependent claims.

Specifically an object of the invention is achieved by an arrangement of an elevation device for a vehicle mounted weapon system. The weapon system comprises a weapon with a gun barrel, and a feeding chute for feeding ammunition to the weapon. Said elevation device is arranged to allow elevation movement of the gun barrel about an elevation axis. Said elevation device has a front portion front of said elevation axis and a rear portion rear of said elevation axis. Said elevation device has a first side and an opposite second side, the weapon having a main extension, running between said sides from the rear portion to the front portion. The gun barrel is projecting through a front side of the front portion in a forward direction. Said elevation is performed in connection to said sides about said elevation axis transversal to the main extension of said weapon. Said feeding chute is configured to be arranged in connection to said first side. Said elevation device comprises a bearing configuration for facilitating said elevation of said weapon about the elevation axis. Said arrangement comprises an arc-shaped sector bearing device of said bearing configuration. Said bearing device is arranged in connection to the front portion at said first side at a radial distance from said elevation axis so as to provide space for said feeding chute on said first side in connection to said elevation axis. Said elevation axis is thus orthogonal and transversal to the main extension of the weapon, and is located between said front and rear portions.

By thus providing such an arc-shaped sector bearing device in connection to the front portion at said first side at a radial distance from said elevation axis space is provided for positioning said weapon for said elevation, wherein space is provided, hereby facilitating space on said first side for arranging a feeding chute in connection to said elevation axis for efficient feeding of ammunition to the weapon. The feeding chute may according to an aspect of the present disclosure be a feeding chute comprising a set of elements assembled together in a stacked configuration, where the set of elements is arranged about a shaft configured to be concentrically arranged relative to the elevation axis so as to allow movement of individual elements of the set of elements about said shaft in connection to elevation movement of the weapon about the elevation axis.

According to an embodiment of the arrangement, said sector bearing device comprises an arc-shaped groove and a set of rollers, wherein said set of rollers are configured to be arranged within said groove, said arc-shaped groove and set of rollers being arranged such that relative movement of said rollers and said groove are provided in connection to elevation movement. Hereby efficient journaling in bearings is provided, facilitating efficient elevation of said weapon.

According to an embodiment of the arrangement, said sector bearing device comprises a bearing housing with an arc-shaped groove, said bearing housing being configured to constitute a fixed portion of said elevation device, fixedly arranged relative to an elevation member of said elevation device, said elevation member providing said elevation movement, said sector bearing device further comprising a bearing member arranged at said elevation member in connection to said first side of the elevation device, and a set of rollers distributed along and attached to said bearing member, said bearing housing being arranged in connection to said bearing member such that said set of rollers fit within said arc-shaped groove and are allowed to move within said groove in connection to elevation movement. Hereby efficient journaling in bearings is provided, facilitating efficient elevation of said weapon.

According to an embodiment of the arrangement, said elevation device is configured to provide elevation of the weapon between a maximum elevation angle and minimum elevation angle, wherein said arc-shaped groove has an extension so as to allow movement of said set of rollers within said groove within a range between said maximum elevation angle and minimum elevation angle. Hereby efficient elevation of said weapon by means of said elevation device is provided.

According to an embodiment of the arrangement, said arc-shaped groove has a rear wall portion with an inner side configured to face in the forward direction, and a front wall portion with an inner side configured to face in the rear direction, wherein said rear wall portion and front wall portion are arranged with a distance between said inner sides and are running parallel with an arc-shaped extension. Hereby efficient journaling in bearings is provided, facilitating efficient elevation of said weapon.

According to an embodiment of the arrangement, the distance between said inner sides of said rear wall portion and front wall portion is slightly larger than the diameter of the respective roller of said set of rollers configured to be distributed along and attached to said bearing member and received within said arc-shaped groove so as to allow rolling of said rollers against an inner side of said inner sides. Hereby efficient elevation of said weapon by means of said elevation device is facilitated in that said rollers are allowed to roll in an efficient way in connection to elevation movement of said weapon.

According to an embodiment of the arrangement, said set of rollers comprises recoil rollers configured to be arranged in connection to the inner side of said rear wall portion so as to take up recoil load of the weapon, and return rollers configured to be arranged in connection to the inner side of said front wall portion so as to take up return load of the weapon. By thus providing and arranging recoil rollers and return rollers, efficient taking up of recoil load and return load of the weapon in connection to operating said weapon is provided, said recoil rollers and return rollers further providing said efficient elevation of said weapon by means of said elevation device.

According to an embodiment of the arrangement, rollers configured to be arranged in connection to one of said inner sides of said arc-shaped groove are configured to be fixedly arranged with regard to the radial position and rollers configured to be arranged to the opposite inner side of said arc-shaped groove are adjustably arranged with regard to the radial position so as to facilitate providing a desirable clearance in rear and forward direction. Thus, rollers configured to be arranged in connection to one of said inner sides of said arc-shaped groove are configured to be fixedly arranged with regard to their respective radial position relative to that inner side and rollers configured to arranged to the opposite inner side of said inner sides of said arc-shaped groove are adjustably arranged with regard to their respective radial position relative to that inner side so as to facilitate providing a desirable clearance in rear and forward direction. Hereby desirable clearance in rear and forward direction may be efficiently provided. By thus facilitating a desirable clearance, efficient elevation of said weapon by rolling of said recoil roller and return roller in said arc-shaped groove by means of said elevation device is hereby provided.

According to an embodiment of the arrangement, said recoil rollers, configured to be arranged in connection to the inner side of said rear wall portion of said arc-shaped groove, are configured to be fixedly arranged with regard to the radial position and said return rollers configured to be arranged in connection to the inner side of said front wall portion of said arc-shaped groove are adjustably arranged with regard to the radial position so as to facilitate providing a desirable clearance in rear and forward direction. Thus, said recoil rollers, configured to be arranged in connection to the inner side of said rear wall portion of said arc-shaped groove, are configured to be fixedly arranged with regard to their respective radial position relative to that inner side, and said return rollers configured to be arranged in connection to the inner side of said front wall portion of said arc-shaped groove are adjustably arranged with regard to their radial position relative to that inner side so as to facilitate providing a desirable clearance in rear and forward direction. Hereby desirable clearance in rear and forward direction may be efficiently provided. By thus facilitating a desirable clearance, efficient elevation of said weapon by rolling of said recoil roller and return roller in said arc-shaped groove by means of said elevation device is hereby provided.

According to an embodiment of the arrangement, said sector bearing device comprises an adjustment arrangement arranged in connection to said bearing member so as to facilitate adjustment of said adjustably arranged rollers. By thus arranging an adjustment arrangement in connection to said bearing member, efficient adjustment of said adjustably arranged rollers is facilitated.

According to an embodiment of the arrangement, said adjustment arrangement comprises a set of adjustment tongues provided by recesses in said bearing member, said adjustably arranged rollers being configured to be attached to said adjustment tongues, said adjustment arrangement further comprising a set of screw joint members, wherein each screw joint member of said set of screw joint members is arranged in connection to an adjustment tongue of said set of adjustment tongues such that, by providing a screw force against that adjustment tongue, adjustment of said tongue is provided such that the radial position of the thus attached roller is moved closer to an inner side of said arc-shaped groove. Hereby, efficient adjustment of said adjustably arranged rollers is facilitated.

According to an embodiment of the arrangement, said set of adjustment tongues with said adjustable rollers are distributed along said bearing member in pairs facing each other, wherein said fixed rollers are configured to be attached at the end of pairs of adjustment tongues. By thus providing and arranging said adjustable rollers and fixed roller, efficient taking up of recoil load and return load of the weapon in connection to operating said weapon is provided, as well as efficient elevation of said weapon by rolling of said rollers in said arc-shaped groove by means of said elevation device.

According to an embodiment of the arrangement, said set of adjustment tongues are shaped so as to facilitate providing an essentially equal stiffness of the sector bearing device in rear and forward direction. Hereby predictability of the behaviour in connection to recoil and return movement of the weapon is provided.

According to an embodiment of the arrangement, said set of adjustment tongues comprises an attachment portion for attaching said adjustable roller and a base portion for said adjustment, wherein the thickness of said base portion is adapted so as to facilitate providing an essentially equal stiffness in rear and forward direction. Hereby predictability of the behaviour in connection to recoil and return movement of the weapon is provided.

According to an embodiment of the arrangement, said sector bearing device comprises a sealing arrangement comprising a sealing device arranged in connection to said arc-shaped groove and configured to face and be arranged against an outer side of said bearing member so as to provide low friction sealing between said bearing housing and bearing member and allow movement of said bearing member relative to said bearing housing in connection to elevation movement. Hereby efficient sealing between said bearing housing and bearing member is facilitated.

According to an embodiment of the arrangement, said sealing member is configured be received in a slot running along said arc-shaped groove, said sealing member comprising a compressible strip member arranged in the bottom of said slot providing a spring function, and a low friction sealing member configured to face and be arranged against said outer side of said bearing member with a first side for said low friction sealing, and configured to, with the opposite side, press against said compressible strip member so as to provide a compressed state for efficient sealing between said bearing housing and bearing member. Hereby efficient sealing between said bearing housing and bearing member is facilitated.

According to an embodiment of the arrangement, the elevation device with said arrangement is configured to be arranged within a turret of a vehicle mounted weapon system for which the arrangement is intended, the weapon system comprising the weapon mounted to a turret via the elevation device, the elevation device being fixedly mounted to said turret via said bearing housing.

Specifically an object of the invention is achieved by a vehicle comprising an arrangement of an elevation device for a weapon system mounted on said vehicle as set out herein. Thus, an object the invention is achieved by a vehicle comprising a weapon system with an elevation device having an arrangement as set out herein.

According to an embodiment, the vehicle is a tracked vehicle. According to an embodiment the vehicle is a combat vehicle.

According to an aspect, an object of the invention is achieved by an elevation device for a vehicle mounted weapon system comprising an arrangement, said elevation device comprising an arrangement as set out herein.

BRIEF DESCRIPTION OF THE FIGURES

For a better understanding of the present disclosure reference is made to the following detailed description when read in conjunction with the accompanying drawings, wherein like reference characters refer to like parts throughout the several views, and in which.

DETAILED DESCRIPTION OF THE DISCLOSURE

Figure 1:
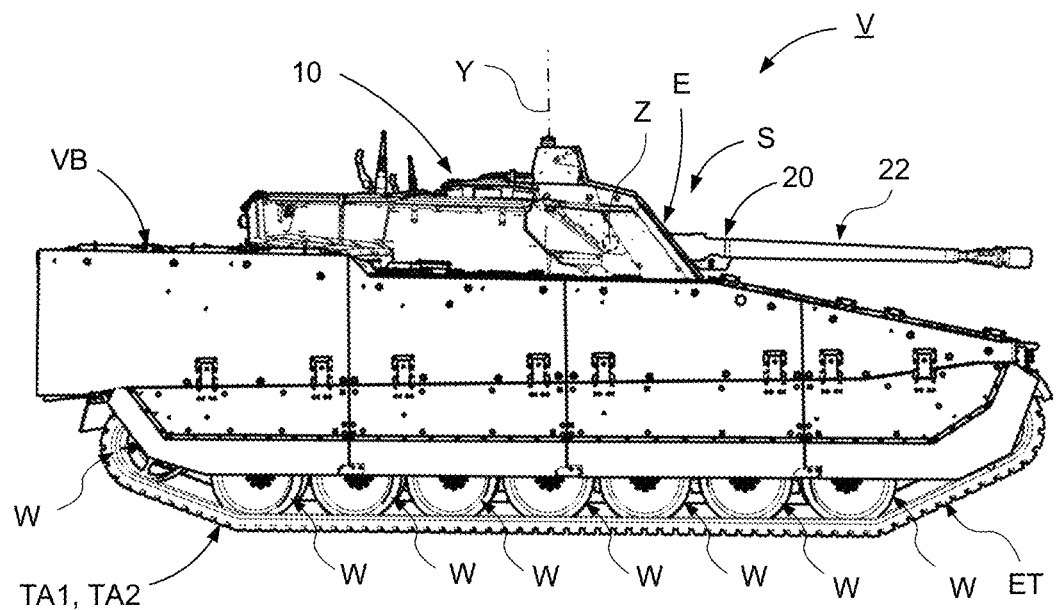
FIG. 1 schematically illustrates a side view of a tracked vehicle according to an embodiment of the present disclosure.

FIG. 1 schematically illustrates a side view of a tracked vehicle V according to an aspect of the present disclosure. The exemplified vehicle V is constituted by a combat vehicle. The tracked vehicle V comprises a vehicle body VB, which according to an aspect of the present disclosure comprises the chassis of the vehicle V and bodywork.

The tracked vehicle V comprises a track assembly pair TA1, TA2 being suspendedly connected to the vehicle body VB. The track assembly pair comprises a right track assembly TA1 and a left track assembly TA2 for driving the vehicle, each track assembly comprising a drive means driven endless track ET arranged to run over a set of wheels W of the track assembly.

Even if the illustrated motor vehicle V is a tracked vehicle the motor vehicle V may according to other embodiments of the invention be constituted by a wheeled vehicle.

The vehicle V is equipped with a turret 10. The turret 10 is arranged on top of the vehicle V. The turret 10 is rotatable about an axis Y of rotation orthogonal to the longitudinal extension of the vehicle V and orthogonal to the transversal extension of the vehicle V.

The vehicle V is configured to be equipped with a weapon system S having a weapon 20. The weapon 20 is mounted to the turret 10. The weapon 20 of the weapon system S is thus allowed to rotate by means of rotating the turret 10 about the axis Y.

The weapon 20 is configured to be connected to an elevation device E, which according to an aspect of the present disclosure may be or may comprise a so called weapon cradle, connected to the turret 10. The elevation device E may be an elevation device E illustrated in FIGS. 3A, 3B, 4A, 4B, 5A and 5B. The weapon 20 is configured to be raised and lowered, i.e. provide an elevation movement, about an elevation axis Z, illustrated in FIGS. 1 and 2, by means of the elevation device E. The weapon 20 comprises a gun barrel 22. The gun barrel 22 of the weapon 20 is configured to be raised and lowered, i.e. provide an elevation movement, about the elevation axis Z.

Said weapon 20 has a main extension. Said elevation axis Z is orthogonal and transversal to the main extension of the weapon 20. Said elevation axis Z is orthogonal and transversal to the main extension of the gun barrel 22 of the weapon 20. The weapon 20 has a front side 22F with an opening through which ammunition is arranged to fired. Said front side 22F of the weapon 20 is the front side of the gun barrel 22 of the weapon 20. The weapon 20 has an opposite rear side 22R opposite to said front side 22F. Said weapon is extending in its main direction from said rear side 22R to said front side 22F. Herein forward direction refers to the direction of the main extension of the weapon 20 associated with the front side 22F of the weapon 20 and rear direction refers to the direction of the main extension of the weapon 20 associated with the rear side 22R of the weapon. In connection to firing of ammunition with said weapon 20 the weapon may be subjected a force causing certain movement of the weapon in forward and rear direction. According to an aspect of the present disclosure, the wording "rear and forward direction" when referring to clearance in the rear and forward direction, herein refers to rear and forward direction of the weapon 20, i.e. the direction of the longitudinal extension of the weapon 20.

Figure 2:
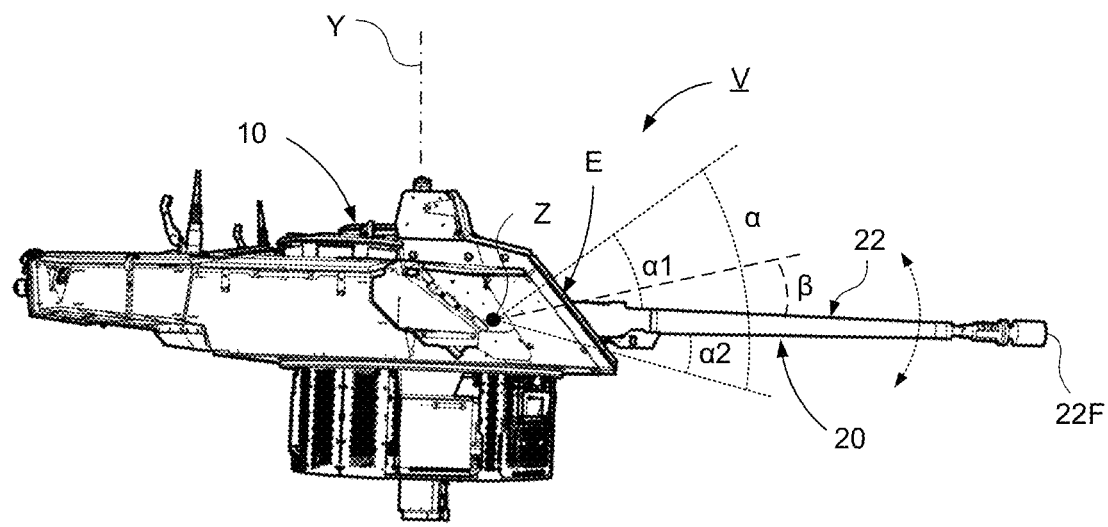
FIG. 2 schematically illustrates a side view of a turret with a weapon system having a weapon according to an embodiment of the present disclosure.

FIG. 2 schematically illustrates a side view of the turret 10 with the weapon system S having a weapon 20 according to an embodiment of the present disclosure.

As mentioned above with reference to FIG. 1, the weapon 20 is configured to be connected to an elevation device E, e.g. an elevation device E illustrated in FIGS. 3A, 3B, 4A, 4B, 5A and 5B. The weapon 20 is configured to be raised and lowered, i.e. provide an elevation movement, about an elevation axis Z by means of the elevation device E.

According to an aspect of the present disclosure, the weapon 20 may be configured to be raised and lowered within an elevation angle α. According to an aspect of the present disclosure, the weapon 20 is configured to be raised from a position corresponding to the longitudinal extension of the vehicle V, i.e. a horizontal position when the vehicle is in a horizontal position, an angle α1, and lowered from that position an angle α2.

Figure 3A:
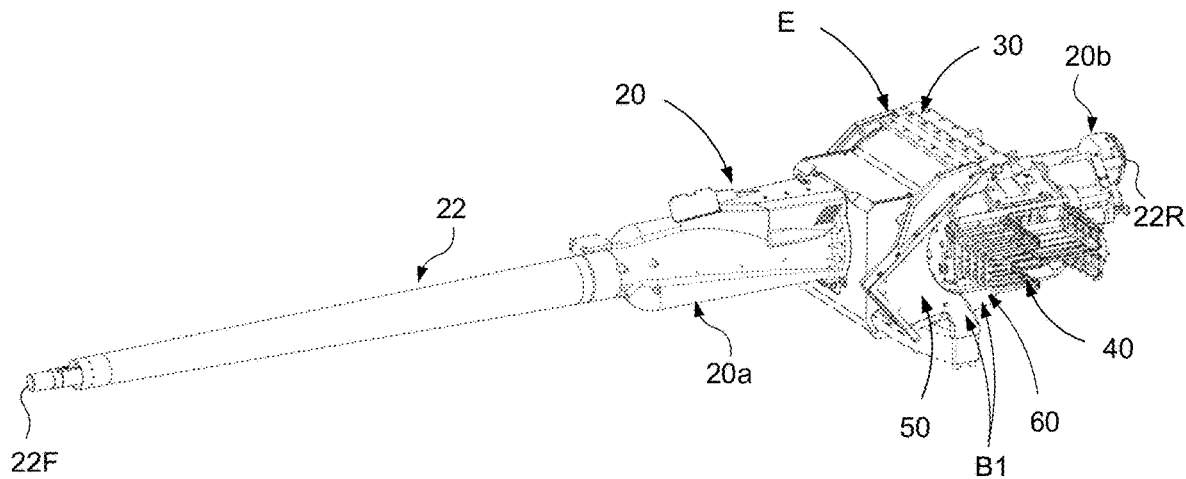
FIG. 3A schematically illustrates a perspective view of an elevation device, a weapon supported by said elevation device so as to allow elevation of said weapon, and a feeding chute for feeding ammunition to the weapon, according to an embodiment of the present disclosure.
Figure 3B:
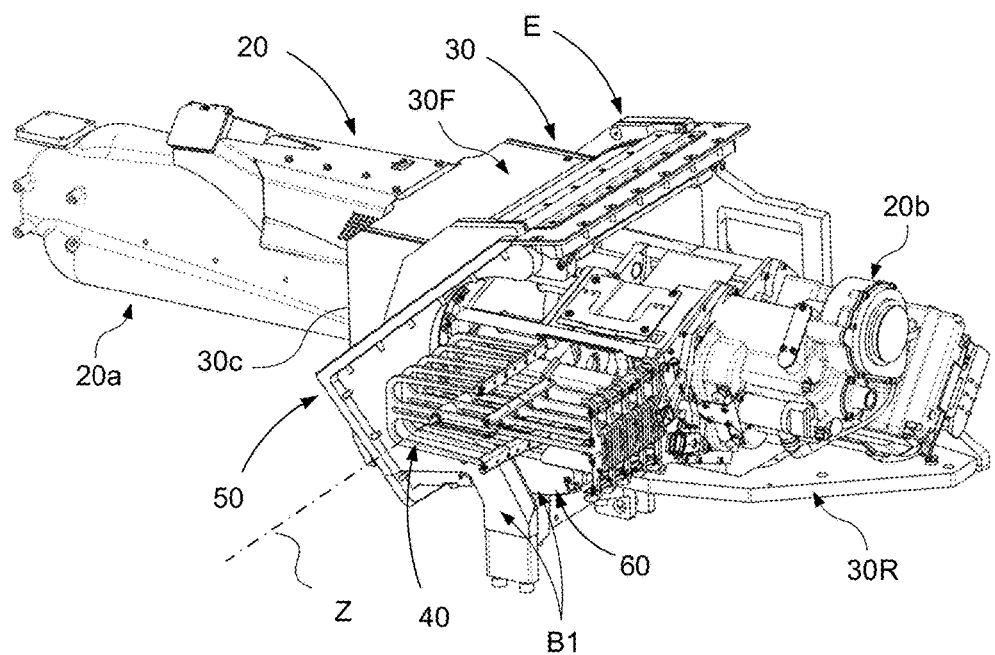
FIG. 3B schematically illustrates another perspective view of the elevation device, portion of the weapon and the feeding chute in FIG. 3A, according to an embodiment of the present disclosure.
Figure 4A:
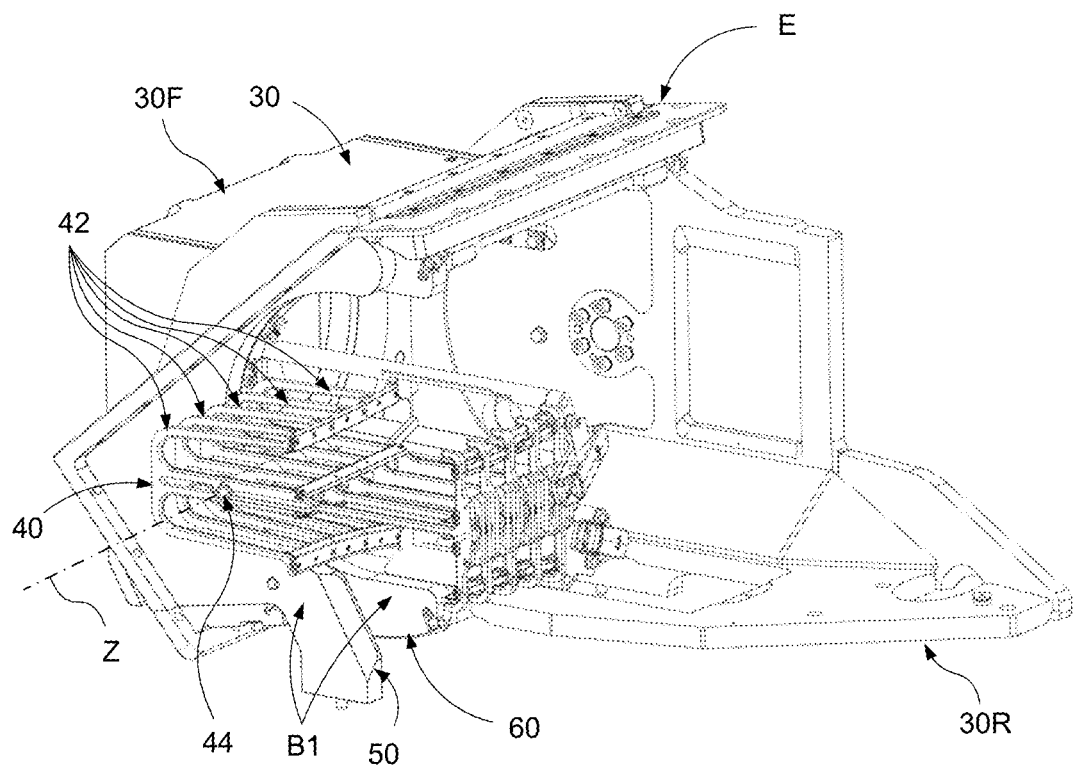
FIG. 4A schematically illustrates a perspective view of the elevation device and feeding chute in FIG. 3A, according to an embodiment of the present disclosure.
Figure 4B:
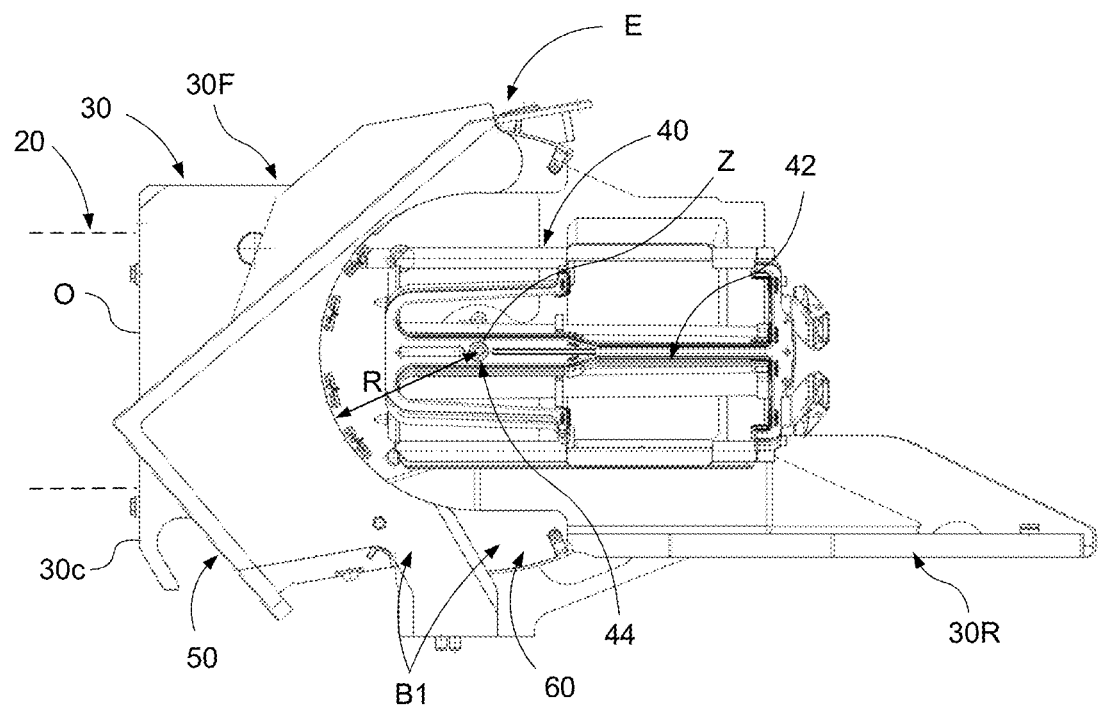
FIG. 4B schematically illustrates a side view of the elevation device and feeding chute in FIG. 4A, according to an embodiment of the present disclosure.

FIG. 3A schematically illustrates a perspective view of an elevation device E, a weapon 20 supported by said elevation device E so as to allow elevation of said weapon 20, and a feeding chute 40 for feeding ammunition to the weapon 20, according to an embodiment of the present disclosure. FIG. 3B schematically illustrates another perspective view of the elevation device E, portion of the weapon 20 and the feeding chute 40 in FIG. 3A, FIG. 4A schematically illustrates a perspective view of the elevation device E and feeding chute 40 in FIG. 3A, and FIG. 4B schematically illustrates another perspective view of the elevation device E and feeding chute 40 in FIG. 4A.

Figure 5A:
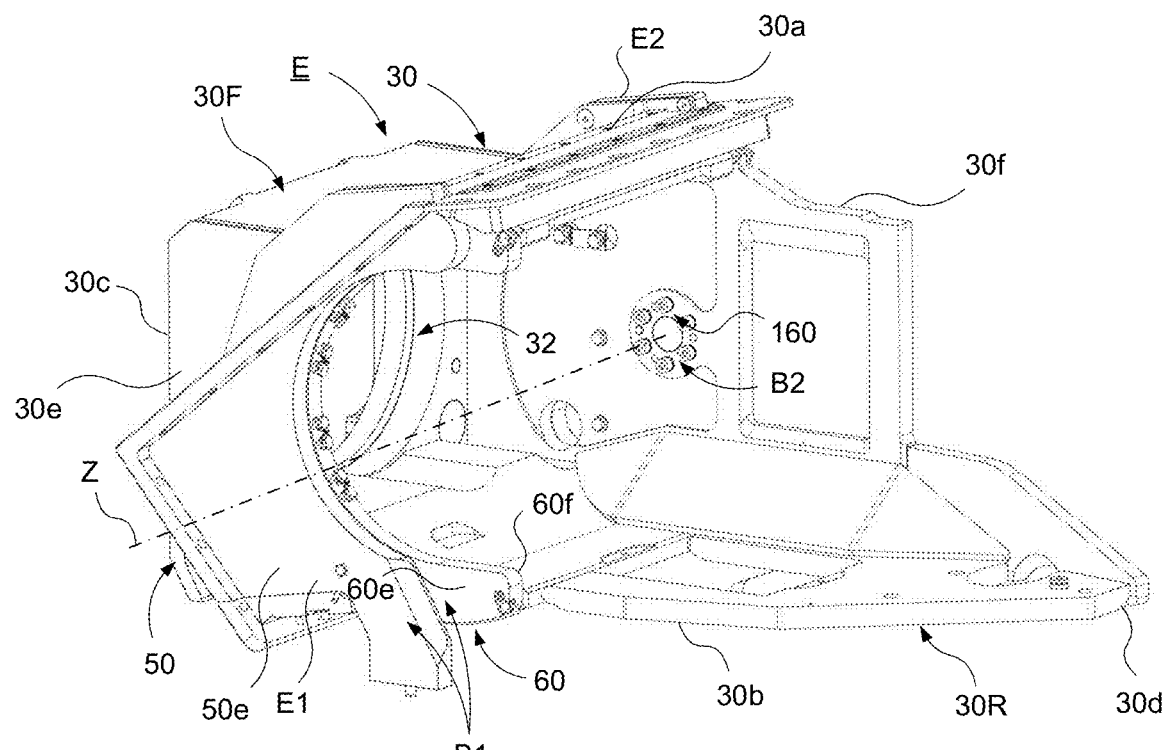
FIG. 5A schematically illustrates a perspective view of the elevation device in FIG. 3A, according to an embodiment of the present disclosure.
Figure 5B:
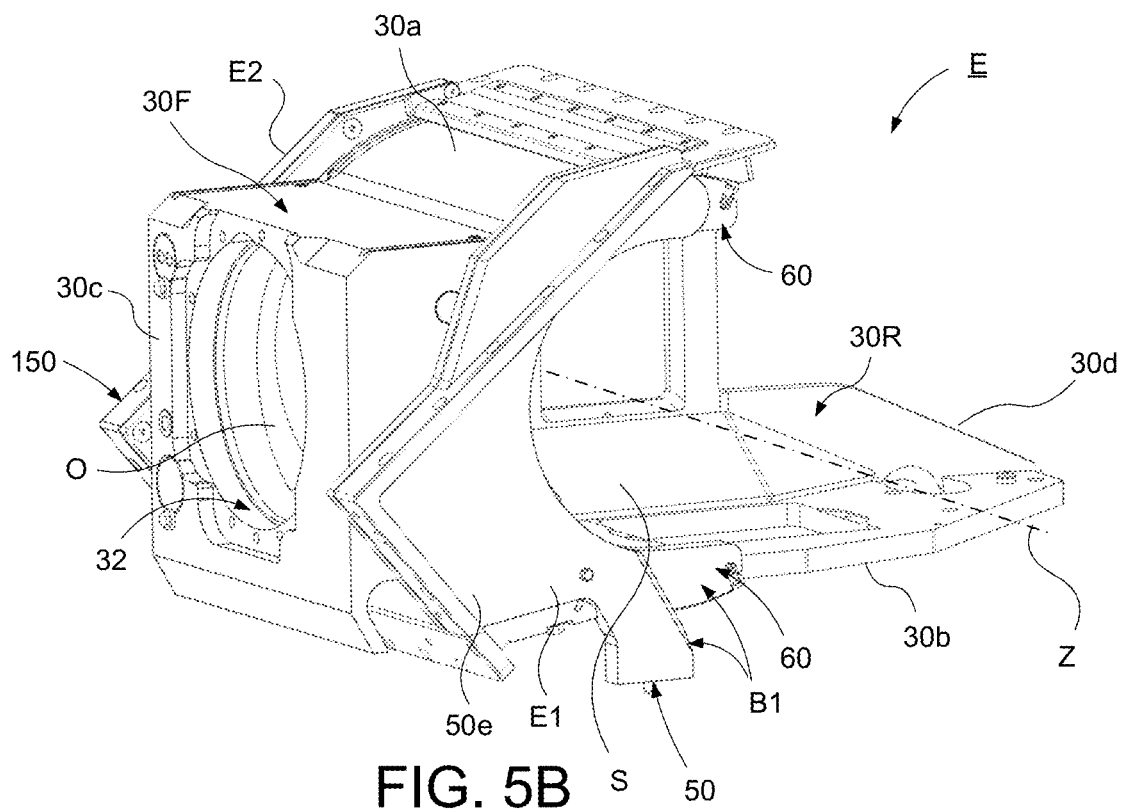
FIG. 5B schematically illustrates another perspective view of the elevation device in FIG. 5A, according to an embodiment of the present disclosure.

FIG. 5A schematically illustrates a perspective view of the elevation device E in FIG. 3A, according to an embodiment of the present disclosure, and FIG. 5B schematically illustrates a side view of the elevation device E in FIG. 5A.

The elevation device E is arranged to allow elevation movement of a gun barrel 22 of the weapon, e.g. a gun barrel as described with reference to FIG. 1 and FIG. 2. The elevation device E is arranged to allow elevation movement of a gun barrel about an elevation axis Z1.

The elevation device E is according to an aspect of the present disclosure configured to be attached to a turret, e.g. a turret 10 according to FIGS. 1 and 2, and thus configured to be rotated with the turret about an axis Y as illustrated in FIG. 1 and FIG. 2.

According to an aspect of the present disclosure, the elevation device E comprises an elevation member 30 configured to provide said elevation movement. According to an aspect of the present disclosure, the elevation member 30 is thus configured to provide the portion of the elevation device E providing said elevation movement for elevation of said weapon 20. According to an aspect of the present disclosure, the weapon 20 is thus configured to be assembled to the elevation member 30.

According to an aspect of the present disclosure, the elevation device E comprises a ring shaped support member 32 for supporting the gun barrel. According to an aspect of the present disclosure, the ring shaped support member 32 has an opening O, see e.g. FIG. 5B, through which the gun barrel 22 is intended to be arranged, see FIGS. 3A and 3B. According to an aspect of the present disclosure, the opening O of the ring shaped support member 32 has an extension corresponding to the extension of the gun barrel 22 when arranged in connection to, e.g. being mounted to, the ring shaped support member 32. The elevation axis Z is arranged in connection to the ring shaped support member 32. The elevation axis Z is orthogonal to the axial extension of the opening O and hence the axial extension of the gun barrel.

According to an aspect of the present disclosure, the elevation device E with the ring shaped support member 32 with the opening O is configured to be journaled in bearings for facilitating rotation of the elevation device E about the axis Z for elevation of the gun barrel 22 when supported by the elevation device E. According to an aspect of the present disclosure, said elevation device E comprises a bearing configuration for facilitating said elevation of said weapon 20 about the elevation axis Z.

According to an aspect of the present disclosure, the elevation device E comprises or is operably connected to a drive arrangement, not shown, for operating the elevation device E for providing said elevation. The drive arrangement may be any suitable drive arrangement.

According to an aspect of the present disclosure, the elevation device E, when assembled to a vehicle being in an essentially horizontal position, has an upper side 30a and a lower side 30b, see e.g. FIGS. 5A and 5B. According to an aspect of the present disclosure, the upper side 30a of the elevation device E constitutes the upper side 30a of the elevation member 30 of the elevation device E and the lower side 30b of the elevation device E constitutes the lower side 30b of the elevation member 30. According to an aspect of the present disclosure, the upper side 30a is a side of the elevation device E and elevation member 30 configured to be arranged over a portion of the weapon 20, when the weapon 20 is assembled to the elevation device E. According to an aspect of the present disclosure, the lower side 30b is a side of the elevation device E and elevation member 30 configured to be arranged under a portion of the weapon 20, when the weapon 20 is assembled to the elevation device E.

According to an aspect of the present disclosure, the elevation device E, when assembled to a vehicle being in an essentially horizontal position, has a front side 30c and an opposite rear side 30d, see e.g. FIGS. 5A and 5B. According to an aspect of the present disclosure, the front side 30c of the elevation device E constitutes the front side 30c of the elevation member 30 of the elevation device E and the rear side 30d of the elevation device E constitutes the rear side 30d of the elevation member 30. The front side 30c is the side of the elevation device E and elevation member 30 from which the weapon 20 and hence the gun barrel 22 is configured to project when the weapon is assembled to the elevation device E.

According to an aspect of the present disclosure, the elevation device E, when assembled to a vehicle being in an essentially horizontal position, has a first side E1 and an opposite second side E2, see e.g. FIG. 5B. According to an aspect of the present disclosure, the first side E1 of the elevation device E constitutes receiving side E1, from which side ammunition is arranged to be fed to the weapon 20. According to an aspect of the present disclosure, the feeding chute 40 is configured to be arranged in connection to said first side E1, i.e. in connection to said receiving side E. According to an aspect of the present disclosure, the weapon 20, having a main extension, is configured to run between said sides E1, E2. According to an aspect of the present disclosure, the elevation member 30, when the elevation device E is assembled to a vehicle being in an essentially horizontal position, has a first side 30e arranged in connection to and constituting a movable portion of said first side E1 of the elevation device E, and an opposite second side 30f arranged in connection to and constituting a movable portion of said second side E2 of the elevation device E, see e.g. FIG. 5A. Said first side 30e and opposite second side 30f of said elevation member 30, constituting movable portions of the side E1, E2, are configured to move during elevation of said elevation member 30, for providing elevation movement of the weapon 20.

According to an aspect of the present disclosure, the weapon 20, having a main extension, is configured to run in its main extension from said rear side 30d, between said first side E1 and second side E2 and upper side 30a and lower side 30b through said front side 30c from which said gun barrel 22 of the weapon is projecting. The weapon 20 has a longitudinal extension corresponding to its main extension. A front portion 20a of said weapon 20 is projecting through said opening O of said support member 32 of said elevation member 30, see e.g. FIGS. 3A and 3B. A rear portion 20b of said weapon 20 is configured to project in the rear direction from said elevation axis Z, see e.g. FIGS. 3A and 3B. According to an aspect of the present disclosure, said front portion 20a of said weapon 20 is a portion 20a of said weapon 20 front of said elevation axis Z and said rear portion 20b of said weapon 20 is a portion 20b of said weapon 20 rear of said elevation axis Z.

According to an aspect of the present disclosure, the sides 30a, 30b, 30c, 30d, 30e and 30f will be referred to as if the elevation device E is arranged on a vehicle, e.g. a vehicle V according to FIG. 1, with a weapon 20 mounted to the elevation device E.

The elevation by means of the elevation member 30 of the elevation device is configured to be performed in connection to said sides first side E1 and second side E2 about said elevation axis Z, said elevation axis being transversal to the main extension of said weapon 20. Said direction of said elevation axis Z is running transversely between said sides E1, E2.

Said elevation device E has a front portion 30F front of said elevation axis Z and a rear portion 30R rear of said elevation axis Z. According to an aspect of the present disclosure, said front side 30c may constitute a front side of said front portion 30F. According to an aspect of the present disclosure, said rear side 30d may constitute a rear side of said rear portion 30R. The weapon 20 is configured to run in its main extension between said sides E1, E2 from the rear portion 30R to the front portion 30F of the elevation device. Said elevation axis Z is orthogonal and transversal to the main extension of the weapon 20 and located between said portions 30F, 30R. Said elevation device E comprises a space through which said weapon 20 is arranged to run from said rear portion 30R to and through said front portion 30F.

According to an aspect of the present disclosure, an arrangement for such an elevation device E of a vehicle mounted weapon system is provided, which facilitates space and arrangement of said weapon 20 of the weapon system.

Said elevation device E comprises a bearing configuration for facilitating said elevation of said weapon 20 about the elevation axis Z. Said elevation device E comprises a bearing configuration for facilitating said elevation of said elevation member 30 of said elevation device E about said elevation axis Z so as to facilitate elevation of said weapon 20 about the elevation axis Z.

According to an aspect of the present disclosure, said bearing configuration comprises bearing devices B1, B2 configured to be arranged in connection to said sides E1, E2 so as to provide journaling in bearings for facilitating elevation about said elevation axis Z of said elevation member 30 of said elevation device E relative to fixed portions 50, 150 of said elevation device E.

According to an aspect of the present disclosure, said bearing configuration comprises a first bearing device B1 configured to be arranged in connection to said first side E1, and a second bearing device B2 configured to be arranged in connection to said second side E2 so as to provide journaling in bearings for facilitating elevation of said elevation member 30 relative to fixed portions 50, 150 of said elevation device E According to an aspect of the present disclosure, said fixed portions 50, 150 of said elevation device E comprises a first fixed portion 50 configured to be arranged in connection to said first side E1, and a second fixed portion 150 configured to be arranged in connection to said second side E2.

According to an aspect of the present disclosure, said first bearing device B1 comprises said first fixed portion 50 or at least a portion of said first fixed portion 50. According to an aspect of the present disclosure, said second bearing device B2 comprises said second fixed portion 150 or at least a portion of said second fixed portion 150.

According to an aspect of the present disclosure, said second bearing device B2 is configured to be centrally arranged about said elevation axis Z in connection to said second side E2, providing a conventional bearing device B2 essentially occupying the space on said second side E2 in connection to said elevation axis Z. Said second bearing device B2 is configured to provide an essentially ring-shaped configuration. According to an aspect of the present disclosure, said second fixed portion 150 comprises or constitutes a bearing housing 150 configured to be fixedly arranged relative to said elevation member 30. According to an aspect of the present disclosure, said second bearing device B2 comprises a bearing member 160 configured be arranged at said elevation member 30 in connection to said second side E2, said bearing member 160 being arranged about said elevation axis Z. According to an aspect of the present disclosure, said fixed portion 150 may be fixedly arranged to a turret of a vehicle, e.g. a turret 10 as described with reference to FIGS. 1 and 2. According to an aspect of the present disclosure, said second bearing device B2 may be any suitable bearing device. According to an aspect of the present disclosure, said second bearing device B2 may be a spherical roller bearing, as disclosed herein. Said second bearing device B2 will not be described in any detail herein.

Said arrangement of an elevation device E for a vehicle mounted weapon system comprises first bearing device B1 of said bearing configuration. Said first bearing device B1 is an arc-shaped sector bearing device B1. Said first bearing device B1 will herein be denoted arc-shaped sector bearing device B1 or sector bearing device B1 or bearing device B1.

Said arc-shaped sector bearing device B1 is configured to be arranged in connection to the front portion 30F at said first side E1 at a radial distance R from said elevation axis Z, see e.g. FIG. 4B, so as to provide space S, see e.g. FIG. 5B, on said first side E1 in connection to said elevation axis Z. Said arc-shaped sector bearing device B1 is configured to be arranged in connection to the front portion 30F at said first side E1 at said radial distance R from said elevation axis Z so that said space S is provided on said first side E1 in connection to said elevation axis Z so as to facilitate arranging said feeding chute 40 in connection to said space S. Said arc-shaped sector bearing device B1 is configured to be arranged in connection to the front portion 30F at said first side E1 at said radial distance R from said elevation axis Z so that an opening is provided into said elevation device E.

Said feeding chute 40 may, according to an aspect of the present disclosure, be a feeding chute 40 comprising a set of elements 42 assembled together arranged about a shaft 44 concentrically arranged relative to the elevation axis Z of the elevation device E for allowing movement of individual elements of the set of elements 42 about said shaft 44 in connection to elevation movement of the elevation device E about the elevation axis Z for efficient feeding of ammunition to the weapon 20. Such a feeding chute 40 is illustrated in FIGS. 3A and 3B and described below.

Figure 6:
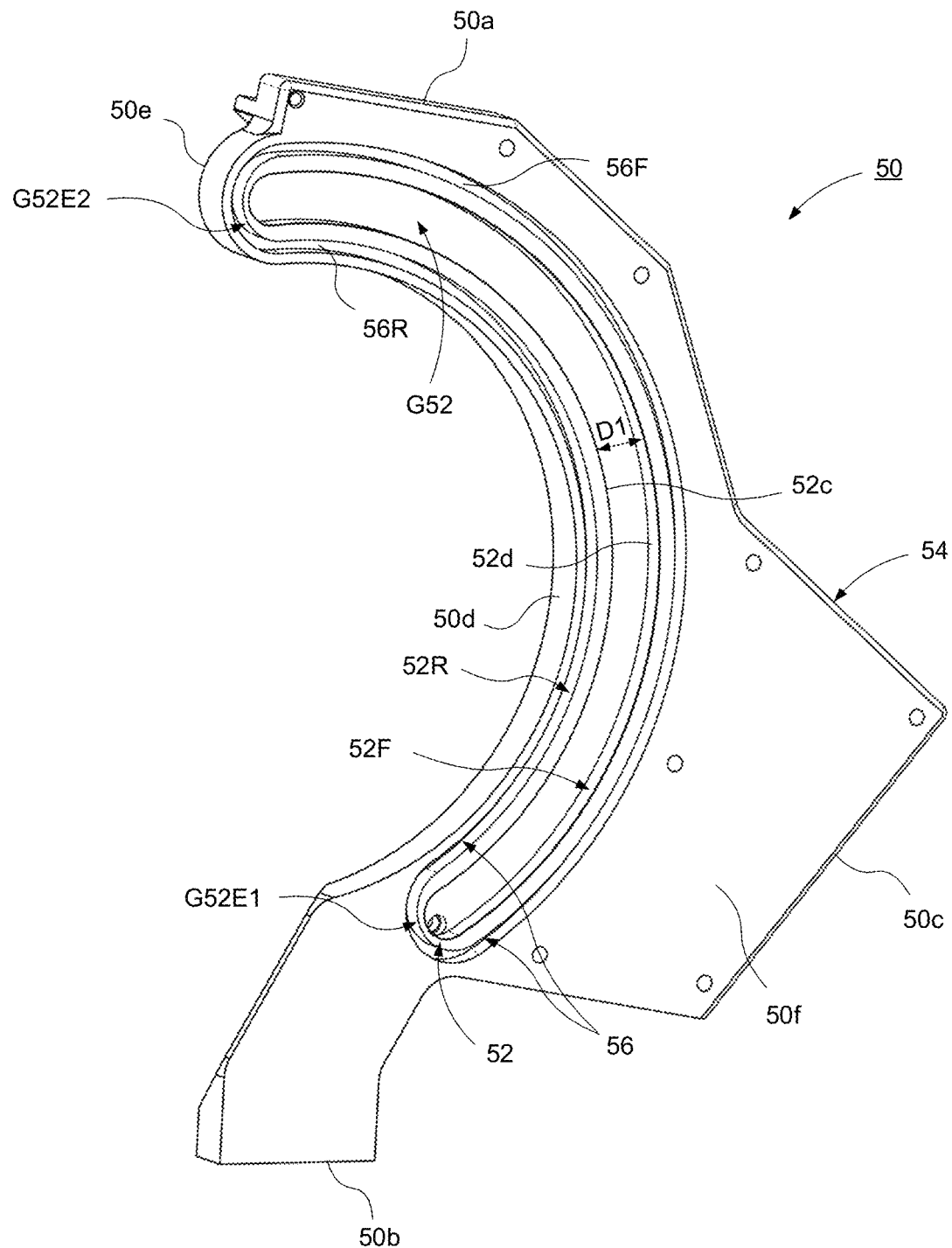
FIG. 6 schematically illustrates a perspective view of a bearing housing of a sector bearing device of the elevation device, according to an embodiment of the present disclosure.
Figure 7:
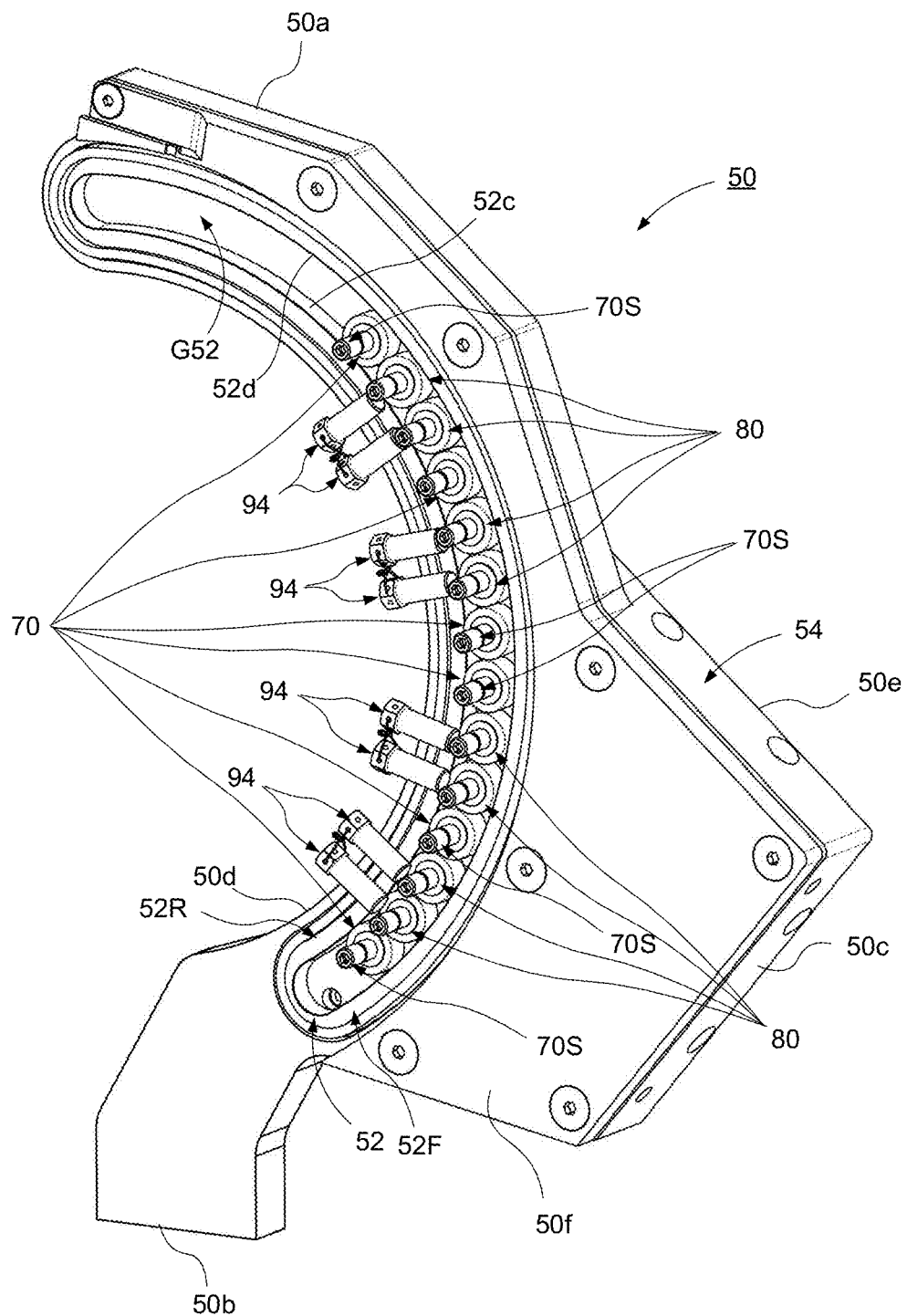
FIG. 7 schematically illustrates a perspective view of the bearing housing in FIG. 6, with a set of rollers arranged in an arc-shaped groove of said bearing housing, according to an embodiment of the present disclosure.

FIG. 6 schematically illustrates a perspective view of a bearing housing 50 of said sector bearing device B1 of the elevation device E, according to an aspect of the present disclosure; and FIG. 7 schematically illustrates a perspective view of the bearing housing in FIG. 6, with a set of rollers 70 arranged in an arc-shaped groove G52 of said bearing housing 50, according to an aspect of the present disclosure.

Figure 8:
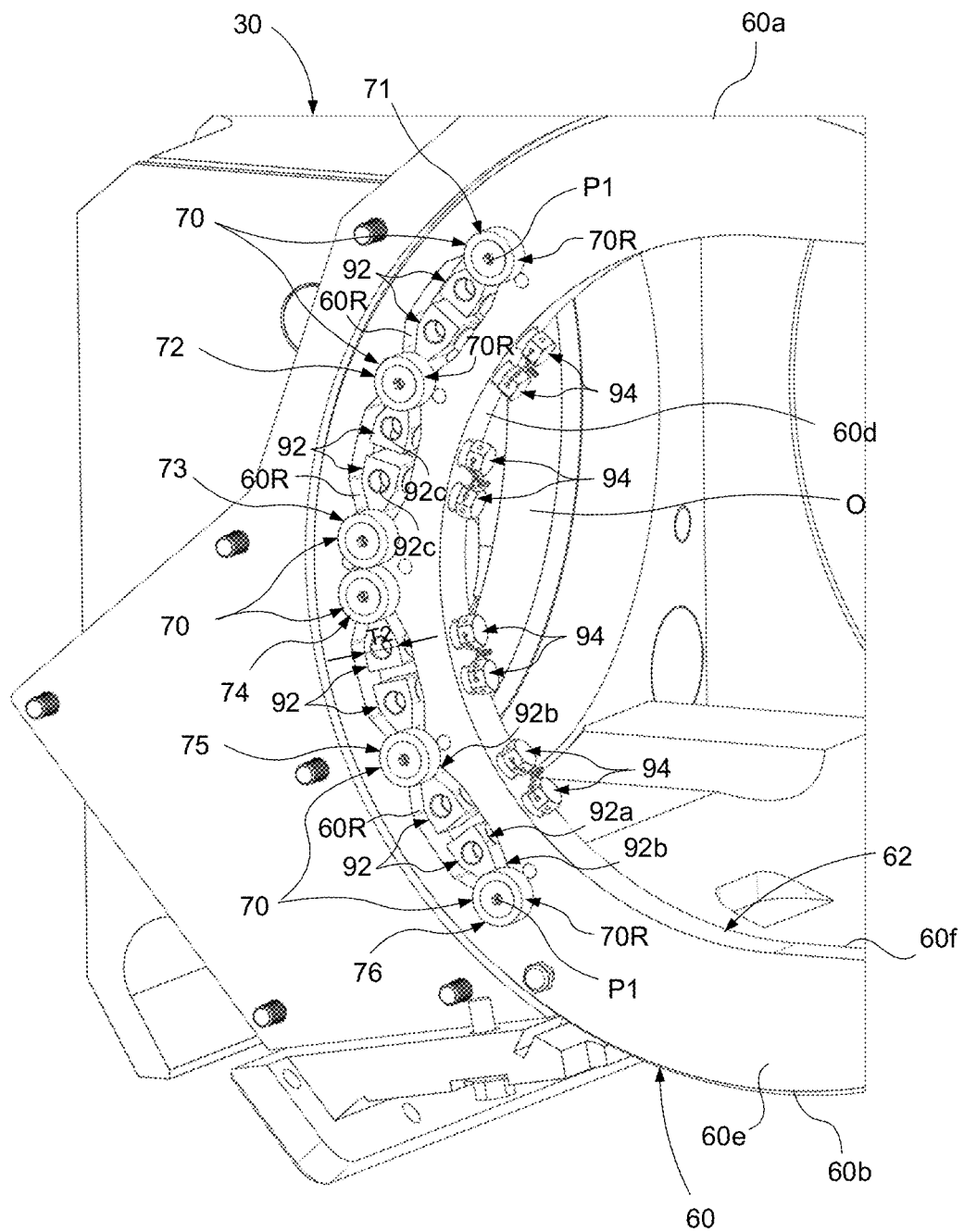
FIG. 8 schematically illustrates a perspective view of a portion of the elevation device in FIG. 5A, with a bearing member of said sector bearing device, recoil rollers being connected to said bearing member, according to an embodiment of the present disclosure.
Figure 9:
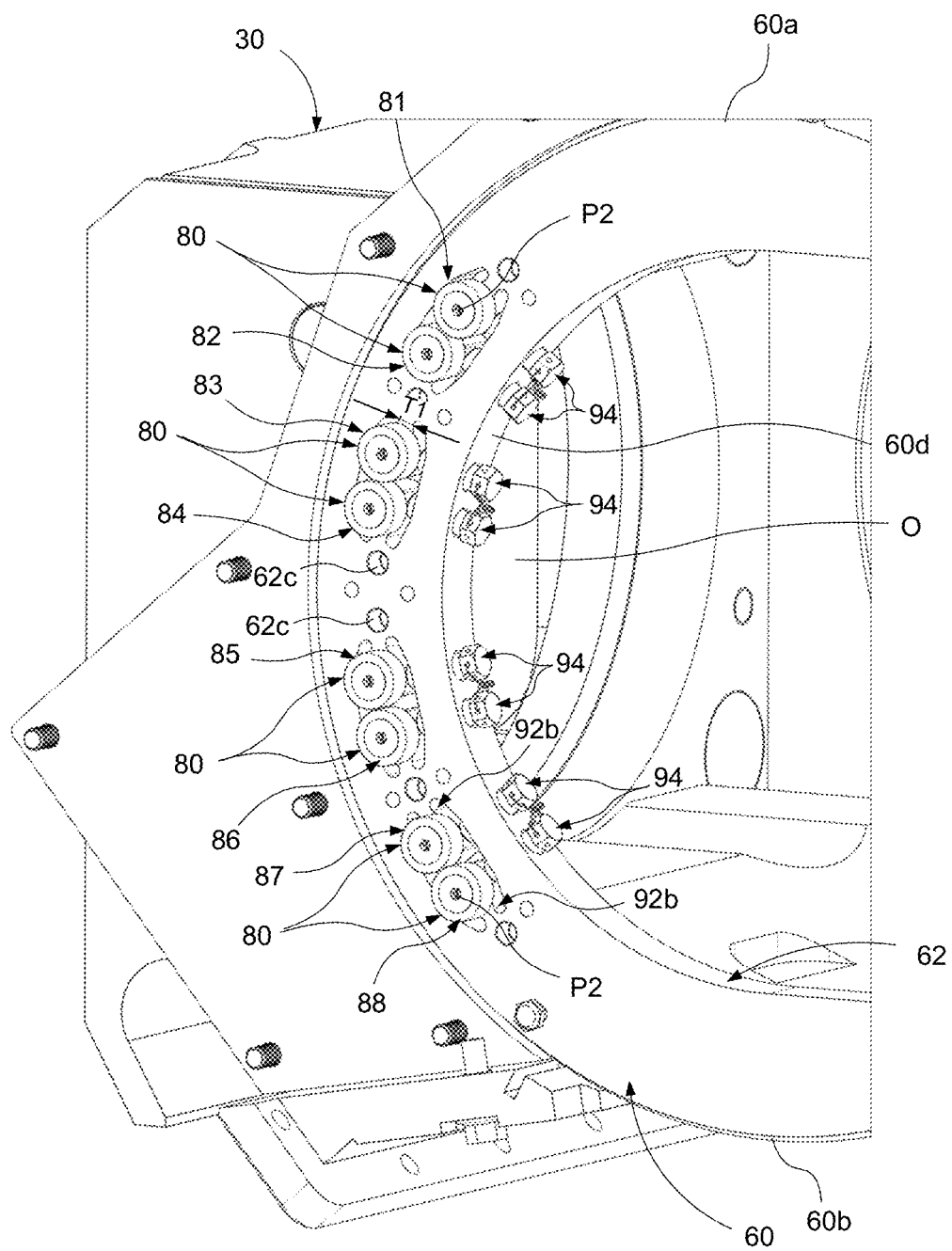
FIG. 9 schematically illustrates a perspective view of a portion of the elevation device in FIG. 5A, with said bearing member in FIG. 8, return rollers being connected to said bearing member, according to an embodiment of the present disclosure; and, FIG. 10 schematically illustrates a cross section of a portion of said sector bearing device, according to an embodiment of the present disclosure.

FIG. 8 schematically illustrates a perspective view of a portion of the elevation device E, with a bearing member 60 of said sector bearing device B1, and FIG. 9 schematically illustrates a perspective view of a portion of the elevation device E, with said bearing member 60.

Figure 10:
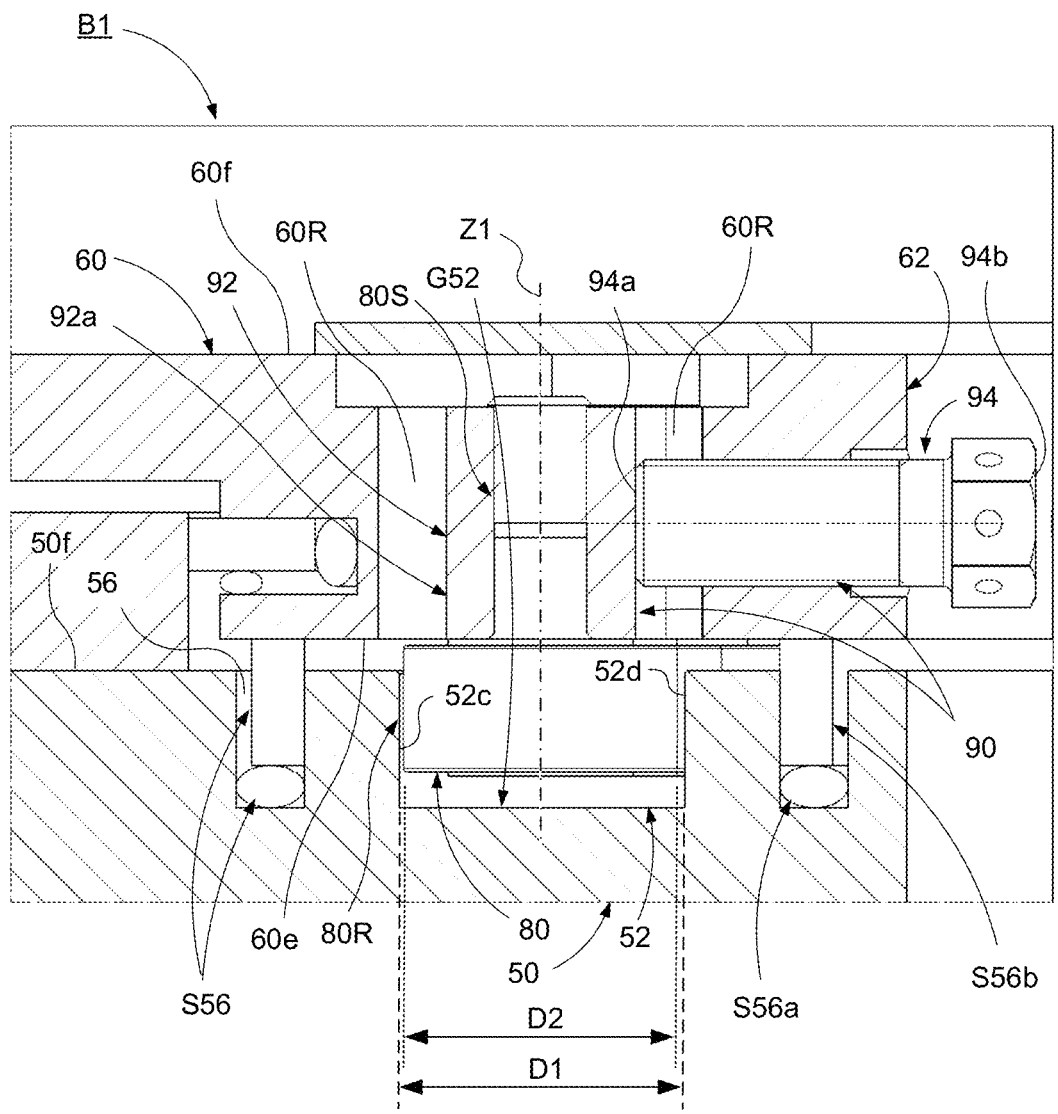

FIG. 10 schematically illustrates a cross section of a portion of said sector bearing device B1, according to an embodiment of the present disclosure.

According to an aspect of the present disclosure, said first fixed portion 50 comprises or constitutes a bearing housing 50 of said sector bearing device B1, see FIGS. 6 and 7, and also FIGS. 3A, 3B, 4A, 4B, 5A, 5B, and 10. Said bearing housing 50 is configured to be fixedly arranged relative to said elevation member 30. According to an aspect of the present disclosure, said bearing housing 50 may be fixedly arranged to a turret of a vehicle, e.g. a turret 10 as described with reference to FIG. 1 and FIG. 2. According to an aspect of the present disclosure, said bearing housing 50 of said sector bearing device B1 has an arc-shaped configuration for facilitating providing said space and hence opening on said first side E1 of said elevation device E in connection to said elevation axis Z.

According to an aspect of the present disclosure, said first bearing device B1 comprises a bearing member 60 configured be arranged at said elevation member 30 in connection to said first side E1. According to an aspect of the present disclosure, said bearing member 60 of said sector bearing device B1 has an arc-shaped configuration for facilitating providing said space and hence opening on said first side E1 of said elevation device E in connection to said elevation axis Z. According to an aspect of the present disclosure, said bearing member 60 of said sector bearing device B1 has an arc-shaped portion 62.

Said bearing housing 50 comprises an arc shaped portion and said bearing member 60 comprises an arc shaped portion, said arc-shaped portion of said bearing housing 50 having an arc shape essentially corresponding to an arc shape of the arc-shaped portion 62 of said bearing member 60.

According to an aspect of the present disclosure, said sector bearing device B1 comprises an arc-shaped groove G52 and a set of rollers 70, 80, wherein said set of rollers 70, 80 are configured to be arranged within said groove G52, said arc-shaped groove G52 and set of rollers 70, 80 being arranged such that relative movement of said rollers 70, 80 and said groove G52 are provided in connection to elevation movement. Said elevation device E illustrated in FIGS. 3A, 3B, 4A, 4B, 5A and 5B with bearing housing 50 detailed in FIGS. 6, 7 and 10, and bearing member detailed in FIGS. 8, 9 and 10 illustrates an embodiment of a bearing device configured to provide such a function and hence arrangement of an elevation device for a vehicle mounted weapon system as set out herein.

According to an aspect of the present disclosure, said bearing housing 50 is configured to provide an outer fixed portion on said first side E1 of said elevation device E, see e.g. FIGS. 5A and 5B According to an aspect of the present disclosure, said bearing housing 50 has an outer side 50e configured to face away from said elevation member 30, see e.g. FIGS. 5A and 5B. According to an aspect of the present disclosure, said bearing housing 50 has an inner side 50f, opposite to said outer side 50e, configured to face towards said elevation member 30, see e.g. FIG. 10. According to an aspect of the present disclosure, said inner side 50f of said bearing housing 50 is configured to face said bearing member 60.

According to an aspect of the present disclosure, said bearing housing 50 has an upper side 50a and an opposite lower side 50b, see e.g. FIG. 6.

According to an aspect of the present disclosure, said bearing housing 50 has a front side 50c configured to face in the forward direction, and an opposite rear side 50d configured to face in the rearward direction, see e.g. FIG. 6. Said rear side 50d provides the surface with an arc shape providing the rear end of the arc-shape of said bearing housing 50.

According to an aspect of the present disclosure, said bearing member 60 has an outer side 60e configured to face away from said elevation member 30, see e.g. FIGS. 5A and 10. According to an aspect of the present disclosure, said bearing member 60 has an inner side 60f, opposite to said outer side 60e, providing a portion of an inner side of said elevation member 30 in connection to the first side E1, see e.g. FIGS. 5a, and 10. According to an aspect of the present disclosure, said outer side 60e of said bearing member 60 is configured to face said inner side 50f of said bearing housing 50.

According to an aspect of the present disclosure, said bearing member 60 has an upper side 60a and an opposite lower side 60b, see e.g. FIG. 8.

According to an aspect of the present disclosure, said bearing member 60 has a front side 60c configured to face in the forward direction, and an opposite rear side 60d configured to face in the rearward direction, see e.g. FIG. 8. Said rear side 60d provides the surface with an arc shape providing the rear end of the arc-shape of said bearing member 60.

According to an aspect of the present disclosure, said bearing housing 50 comprises an arc-shaped groove G52, see e.g. FIGS. 6 and 7. According to an aspect of the present disclosure, said arc-shaped groove G52 is configured to be arranged on said inner side 50f of said bearing housing 50.

According to an aspect of the present disclosure, said arc-shaped groove G52 is configured to face said bearing member 60.

According to an aspect of the present disclosure, said sector bearing device B1 comprises a set of rollers 70, 80 configured to be movably arranged within said groove G52. According to an aspect of the present disclosure, said set of rollers 70, 80 are configured to be distributed along and attached to said bearing member 60. According to an aspect of the present disclosure, said bearing housing 50 is configured to be arranged in connection to said bearing member 60 such that said set of rollers 70, 80 distributed along and attached to said bearing member 60 fit within said arc-shaped groove G52 and are allowed to move within said groove G52 in connection to elevation movement.

According to an aspect of the present disclosure, said arc-shaped groove G52 has a rear wall portion 52R with an inner side 52c configured to face in the forward direction. According to an aspect of the present disclosure, said arc-shaped groove G52 has a front wall portion 52F with an inner side 52d configured to face in the rear direction. Said inner side 52d of said front wall portion 52F is configured to face said inner side 52c of said rear wall portion 52R of said arc-shaped groove G52. See FIG. 6.

According to an aspect of the present disclosure, said rear wall portion 52R and front wall portion 52F are arranged with a distance D1 between said inner sides 52c, 52d and are running parallel with an arc-shaped extension. Said arc-shaped groove G52 thus has an arc-shaped extension with parallel wall portions 52R, 52F at a predetermined distance, having inner sides 52c, 52d facing each other.

According to an aspect of the present disclosure, the distance D1 between said inner sides 52c, 52d of said rear wall portion 52R and front wall portion 52F is slightly larger than the diameter D2 of the respective roller 70, 80 of said set of rollers 70, 80 configured to be distributed along and attached to said bearing member 60 and received within said arc-shaped groove G52 so as to allow rolling of said rollers 70, 80 against an inner side of said inner sides 52c, 52d, see e.g. FIG. 10.

According to an aspect of the present disclosure, said set of rollers 70, 80 comprises recoil rollers 70 configured to be arranged in connection to the inner side 52c of said rear wall portion 52R so as to take up recoil load of the weapon 20. According to an aspect of the present disclosure, said recoil rollers 70 configured to be arranged against the inner side 52c of said rear wall portion 52R are thus arranged in connection to said inner side 52c of said rear wall portion 52R so that they are allowed to roll against said inner wall 52c in connection to elevation movement of said elevation member 30 and hence movement of said bearing member 60 about said elevation axis.

According to an aspect of the present disclosure, said set of rollers 70, 80 comprises return rollers 80 configured to be arranged in connection to the inner side 52d of said front wall portion 52F so as to take up return load of the weapon 20. According to an aspect of the present disclosure, said return rollers 80 configured to be arranged against the inner side 52d of said front wall portion 52F are thus arranged in connection to said inner side 52d of said front wall portion 52F so that they are allowed to roll against said inner wall 52d in connection to elevation movement of said elevation member 30 and hence movement of said bearing member 60 about said elevation axis.

According to an aspect of the present disclosure, rollers configured to be arranged in connection to one of said inner sides 52c, 52d of said arc-shaped groove G52 are configured to be fixedly arranged with regard to the radial position P1 and rollers configured to be arranged to the opposite inner side of said arc-shaped groove G52 are adjustably arranged with regard to the radial position P2 so as to facilitate providing a desirable clearance in rear and forward direction.

According to an aspect of the present disclosure, when referring to rollers configured to be arranged in connection to one of said inner sides 52c, 52d of said arc-shaped groove G52 with regard to the radial position, refers to the closest distance in the radial direction from the centre of that roller to the inner side in connection to which that roller is configured to be arranged. The centre of a roller is the axial centre, i.e. the axis about which a roller is rotatable.

Thus, according to an aspect of the present disclosure, rollers, configured to be arranged in connection to one of said inner sides 52c, 52d of said arc-shaped groove G52, are configured to be fixedly arranged with regard to their respective radial position P1 relative to that inner side, and rollers configured to be arranged to the opposite inner side of said arc-shaped groove G52 are adjustably arranged with regard to their respective radial position P2 relative to that inner side so as to facilitate providing a desirable clearance in rear and forward direction.

According to an aspect of the present disclosure, said recoil rollers 70 configured to be arranged in connection to the inner side 52c of said rear wall portion 52R of said arc-shaped groove G52 are configured to be fixedly arranged with regard to the radial position P1, see FIG. 8. Thus, according to an aspect of the present disclosure, said recoil rollers 70, configured to be arranged in connection to the inner side 52c of said rear wall portion 52R of said arc-shaped groove G52, are configured to be fixedly arranged with regard to their respective radial position P1 relative to the inner side 52c of said rear wall portion 52R, see FIG. 8. Thus, according to an aspect of the present disclosure said recoil rollers 70 are configured to be fixedly arranged so that the closest distance in the radial direction from the centre of the respective recoil roller 70 to the inner side 52c of said rear wall portion 52R of said arc-shaped groove G52 essentially does not change.

According to an aspect of the present disclosure, said arc-shaped portion 62 of said bearing member 60 comprises a set of central attachment openings 62c for receiving said recoil rollers 70. According to an aspect of the present disclosure, said set of central attachment openings 62c are arranged as central recesses on the outer side 60e such that said recoil rollers 70, when attached to said central attachment openings 62c, are arranged in connection to the inner side 52c of said rear wall portion 52R of said arc-shaped groove G52 so that they are fixedly arranged with regard to the radial position P1, i.e. their respective radial position P1. The radial position P1 of the recoil rollers 70, i.e. the respective recoil rollers 70, is the position of the radius of the recoil rollers 70, i.e. distance from centre of the recoil roller 70 to the outer edge of the recoil roller 70, relative to the inner side 52c of said rear wall portion 52R, when the recoil roller 70 is arranged within said arc-shaped groove G52.

According to an aspect of the present disclosure, said recoil rollers 70 comprises a roller portion 70R configured to be arranged in connection to the inner side 52c of said rear wall portion 52R of said arc-shaped groove G52. According to an aspect of the present disclosure, said roller portion 70R is configured to be arranged to roll against the inner side 52c of said rear wall portion 52R of said arc-shaped groove G52 of said bearing housing 50 in connection to an elevation movement of said elevation device E.

According to an aspect of the present disclosure, said recoil rollers 70 comprises a shaft portion 70S configured to be received in said central attachment opening 62c.

According to an aspect of the present disclosure, said return rollers 80 configured to be arranged in connection to the inner side 52d of said front wall portion 52F of said arc-shaped groove G52 are adjustably arranged with regard to the radial position P2 so as to facilitate providing a desirable clearance in rear and forward direction, see FIG. 9. Thus, according to an aspect of the present disclosure, said return rollers 80, configured to be arranged in connection to the inner side 52d of said front wall portion 52F of said arc-shaped groove G52, are adjustably arranged with regard to their respective radial position P2 relative to the inner side 52d of said front wall portion 52F so as to facilitate providing a desirable clearance in rear and forward direction, see FIG. 9. Thus, according to an aspect of the present disclosure said return rollers 80 are configured to be adjustably arranged so that the closest distance in the radial direction from the centre of the respective return roller 80 to the inner side 52d of said front wall portion 52F of said arc-shaped groove G52 is adjustable, i.e. may change.

According to an aspect of the present disclosure, said elevation device E is configured to provide elevation of the weapon 20 between a maximum elevation angle α1 and minimum elevation angle α2, see e.g. FIG. 2. According to an aspect of the present disclosure, said arc-shaped groove G52 has an extension so as to allow movement of said set of rollers 70, 80 within said groove within a range between said maximum elevation angle α1 and minimum elevation angle α2.

According to an aspect of the present disclosure, said sector bearing device B1 comprises an adjustment arrangement 90 arranged in connection to said bearing member 60 so as to facilitate adjustment of said adjustably arranged rollers. According to an aspect of the present disclosure, said adjustment arrangement 90 is arranged in connection to said bearing member 60 so as to facilitate adjustment of said adjustably arranged return rollers 80 arranged in connection to the inner side 52d of said front wall portion 52F of said arc-shaped groove G52.

According to an aspect of the present disclosure, said adjustment arrangement 90 comprises a set of adjustment tongues 92 provided by recesses 60R in said bearing member 60, see e.g. FIGS. 8 and 10. According to an aspect of the present disclosure, said recesses 60R are arranged in said arc-shaped portion 62 of said bearing member 60. According to an aspect of the present disclosure, said recesses 60R are distributed along said arc-shaped portion 62 of said bearing member 60. According to an aspect of the present disclosure, said recesses 60R are configured to run through the said arc-shaped portion 62 of said bearing member 60 from the outer side 60e to and through the inner side 60f.

According to an aspect of the present disclosure, said set of adjustment tongues 92 are distributed along said bearing member 60. According to an aspect of the present disclosure, said set of adjustment tongues 92 are distributed along said bearing member 60 in pairs facing each other. According to an aspect of the present disclosure, said set of adjustment tongues 92 are distributed along said arc-shaped portion 62 of said bearing member 60 in pairs facing each other. See e.g. FIG. 8.

According to an aspect of the present disclosure, said return rollers 80 are configured to be attached to said adjustment tongues 92 so as to facilitate adjustment of said return rollers 80.

According to an aspect of the present disclosure, said set of adjustment tongues 92 comprises an attachment portion 92a for attaching said adjustable roller 80 and a base portion 92b for said adjustment. According to an aspect of the present disclosure, the thickness T1 of said base portion 92b is adapted so as to facilitate providing an essentially equal stiffness of the complete sector bearing device B1 in rear and forward direction, see FIG. 9. According to an aspect of the present disclosure, the thickness T2 of said attachment portion 92a is greater than the thickness of said base portion 92b for facilitating attachment of said return roller 80.

According to an aspect of the present disclosure, said set of adjustment tongues 92 comprises a central attachment opening 92c for receiving said return roller 80.

According to an aspect of the present disclosure, said return rollers 80 comprises a roller portion 80R configured to be arranged in connection to the inner side 52d of said front wall portion 52F of said arc-shaped groove G52. According to an aspect of the present disclosure, said roller portion 80R is configured to be arranged to roll against the inner side 52d of said front wall portion 52F of said arc-shaped groove G52 of said bearing housing 50 in connection to an elevation movement of said elevation device E. See FIG. 10.

According to an aspect of the present disclosure, said return rollers 80 comprises a shaft portion 80S configured to be received in said central attachment opening 92c. See FIG. 10.

According to an aspect of the present disclosure, said return roller 80 is configured to roll about an axis Z1. Said axis Z1 is running from said outer side 60e to said inner side 60f of said bearing member 60.

According to an aspect of the present disclosure, said set of adjustment tongues 92 are shaped so as to facilitate providing an essentially equal stiffness of the complete sector bearing device B1 in rear and forward direction, i.e. the direction of the movement of the weapon in connection to recoil and return forces.

According to an aspect of the present disclosure, said adjustment arrangement 90 further comprises a set of screw joint members 94, see e.g. FIGS. 7 and 8. According to an aspect of the present disclosure, each screw joint member 94 of said set of screw joint members 94 is arranged in connection to an adjustment tongue 92 of said set of adjustment tongues 92 such that, by providing a screw force against that adjustment tongue 92, adjustment of said tongue 92 is provided such that the radial position P2 of the thus attached return roller 80 is moved closer to said inner side 52d of said front wall portion 52F of said arc-shaped groove G52. The radial position P2 of the return roller 80 is the position of the radius of the return roller, i.e. distance from centre of the return roller 80 to the outer edge of the return roller 80, relative to the inner side 52d of said front wall portion 52F, when the return roller 80 is arranged within said arc-shaped groove G52.

According to an aspect of the present disclosure, each screw joint member 94 of said set of screw joint members 94 is arranged in connection to an adjustment tongue 92 of said set of adjustment tongues 92 such that, by providing a screw force against that adjustment tongue 92, adjustment of said tongue 92 is provided such that the thus attached return roller 80 is moved closer to said inner side 52d of said front wall portion 52F of said arc-shaped groove G52.

According to an aspect of the present disclosure, each screw joint member 94 of said set of screw joint members 94 comprises a head portion 94a and a shank portion 94b.

According to an aspect of the present disclosure, each screw joint member 94 of said set of screw joint members 94 is configured to be arranged in connection to said arc-shaped portion 62 of said bearing member 60 such that said shank portion 94b is arranged through a portion of said arc-shaped portion 62 such that the end of said shank portion 94b is brought into contact with an adjustment tongue 92 and such that said head portion 94a is accessible for adjustment.

According to an aspect of the present disclosure, each screw joint member 94 of said set of screw joint members 94 is configured to be arranged in connection to said arc-shaped portion 62 of said bearing member 60 such that said shank portion 94b is introduced from the rear side 60d of said arc-shaped portion 62 such that the end of said shank portion 94b is brought into contact with an adjustment tongue 92 so that, when providing a screw force against that adjustment tongue 92, adjustment of said tongue 92 is provided such that the thus attached return roller 80 is moved closer to said inner side 52d of said front wall portion 52F of said arc-shaped groove G52.

According to an aspect of the present disclosure, each screw joint member 94 of said set of screw joint members 94 is arranged in connection to an adjustment tongue 92 of said set of adjustment tongues 92 such that, by reducing the screw force against that adjustment tongue 92, adjustment of said tongue 92 is provided such that the thus attached return roller 80 is moved further away from said inner side 52d of said front wall portion 52F of said arc-shaped groove G52.

According to an aspect of the present disclosure, said set of central attachment openings 62c for receiving said recoil rollers 70 are arranged at the end of pairs of adjustment tongues 92.

According to an aspect of the present disclosure, said set of recoil rollers 70 distributed along said arc-shaped portion 62 of said bearing member 60 comprises a first recoil roller 71, a second recoil roller 72, a third recoil roller 73, a fourth recoil roller 74, a fifth recoil roller 75, and a sixth recoil roller 76. According to an aspect of the present disclosure, said first recoil roller 71 is arranged as an end recoil roller 71 at the end of a pair of adjustment tongues 92. According to an aspect of the present disclosure, said second recoil roller 72 is arranged between pairs of adjustment tongues 92 and thus at the end of pairs of adjustment tongues 92. According to an aspect of the present disclosure, said third recoil roller 73 is arranged between pairs of adjustment tongues 92 and thus at the end of pairs of adjustment tongues 92. According to an aspect of the present disclosure, said fourth recoil roller 74 is arranged between pairs of adjustment tongues 92 and thus at the end of pairs of adjustment tongues 92. According to an aspect of the present disclosure, said fifth recoil roller 75 is arranged between pairs of adjustment tongues 92 and thus at the end of pairs of adjustment tongues 92. According to an aspect of the present disclosure, said sixth recoil roller 76 is arranged as another end recoil roller 76 at an end of a pair of adjustment tongues 92, at an opposite end relative to the first recoil roller 71. See FIG. 8.

According to an aspect of the present disclosure, said set of return rollers 80 distributed along said arc-shaped portion 62 of said bearing member 60 comprises a first return roller 81, a second return roller 82, a third return roller 83, a fourth return roller 84, a fifth return roller 85, a sixth return roller 86 a seventh return roller 87, and an eighth return roller 88, return roller being connected to an adjustment tongue 92. See FIG. 9.

According to an aspect of the present disclosure, said sector bearing device B1 comprises a sealing arrangement 56, S56, S56a, S56b, for providing sealing between said bearing housing 50 and bearing member 60 and allow movement of said bearing member 60 relative to said bearing housing 50 in connection to elevation movement, see FIG. 10.

According to an aspect of the present disclosure, said sealing arrangement comprises a sealing device S56 arranged in connection to said arc-shaped groove G52 and configured to face and be arranged against said outer side 60e of said bearing member 60 so as to provide low friction sealing between said bearing housing 50 and bearing member 60 and allow movement of said bearing member 60 relative to said bearing housing 50 in connection to elevation movement.

According to an aspect of the present disclosure, said sealing arrangement comprises a slot 56 running along said arc-shaped groove G52 so as to facilitate arranging said sealing device S56 in connection to said arc-shaped groove G52, see e.g. FIG. 6 and FIG. 10. According to an aspect of the present disclosure, said slot 56 is an arc-shaped slot running along and around said front wall portion 52F and rear wall portion 52R of said arc-shaped groove 52 of said bearing housing 50. According to an aspect of the present disclosure, said front wall portion 52F and rear wall portion 52R of said arc-shaped groove 52 are connected to each other in the respective end of said arc-shaped groove providing a curved end portion G52E1, G52E2 at the respective end. According to an aspect of the present disclosure, said slot 56 is an arc-shaped recess running along and around said front wall portion 52F and rear wall portion 52R.

According to an aspect of the present disclosure, said sealing member S56 is configured be received in said slot 56 running along said arc-shaped groove G52.

According to an aspect of the present disclosure, said sealing member S56 comprises a compressible strip member S56a arranged in the bottom of said slot 56 configured to provide a spring function. According to an aspect of the present disclosure, said sealing member S56 further comprises a low friction sealing member S56b configured to face and be arranged against said outer side 60e of said bearing member 60 with a first side for said low friction sealing, and configured to, with the opposite side, press against said compressible strip member S56a so as to provide a compressed state for efficient sealing between said bearing housing 50 and bearing member 60. See FIG. 10.

FIGS. 3A and 3B and FIGS. 4A and 4B schematically illustrate different views with the feeding chute 40 being arranged in connection to said first side E1 of the elevation device E according to an aspect of the present disclosure.

The feeding chute 40 comprises a set of elements 42 assembled together in a stacked configuration. The individual elements of the set of elements 42 may also be denoted ribs or rib elements.

The set of elements 42 is arranged about a shaft 44, see e.g. FIGS. 4A and 4B, configured to be concentrically arranged relative to the elevation axis Z of the elevation device E, so as to allow movement of individual elements of the set of elements 42 about said shaft 44 in connection to elevation movement of the weapon about the elevation axis Z.

According to an aspect of the present disclosure, the feeding chute 40 is comprised in an arrangement for feeding ammunition to the weapon. The feeding chute 40 is configured to be connected at one end to the weapon 20. The end of the feeding chute 40 configured to be connected to the weapon is faced towards the elevation device E in connection to said first side E1. According to an aspect of the present disclosure, the feeding chute 40 is arranged in connection to the elevation device E so that the shaft 44 is coaxial relative to the elevation axis Z.

According to an aspect of the present disclosure, the respective individual element of the set of elements 42 has an extension essentially perpendicular to the direction of the shaft 44. According to an aspect of the present disclosure, the respective individual element of the set of elements 42 has a rotational plane essentially perpendicular to the direction of the shaft 44 and hence direction of the elevation axis Z, when the feeding chute is assembled to the weapon in connection to the elevation device E.

According to an aspect of the present disclosure, the feeding chute 40 is comprised in a chute configuration.

According to an aspect of the present disclosure, such a chute configuration may further comprise a guiding chute, not shown, for guiding the ammunition from an ammunition magazine, not shown, to the feeding chute 40. The ammunition magazine may have any suitable configuration for housing ammunition.

According to an aspect of the present disclosure, the elevation device E with said arrangement is configured to be arranged within a turret 10 of a vehicle mounted weapon system C for which the arrangement for the elevation device E is intended. According to an aspect of the present disclosure, the weapon system C comprises the weapon 20 mounted to the turret 10 via the elevation device E. According to an aspect of the present disclosure, the elevation device E is configured to be fixedly mounted to said turret 10 via said first bearing housing 50 and second bearing housing 150.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An arrangement of an elevation device for a vehicle mounted weapon system, the weapon system comprising a weapon with a gun barrel, and a feeding chute for feeding ammunition to the weapon, said elevation device being arranged to allow elevation movement of the gun barrel about an elevation axis, said elevation device having a front portion front of said elevation axis and a rear portion rear of said elevation axis, said elevation device having a first side and an opposite second side, the weapon having a main extension, running between said sides from the rear portion to the front portion, the gun barrel projecting through a front side of the front portion in a forward direction, said elevation being performed in connection to said sides about said elevation axis transversal to the main extension of said weapon, said feeding chute being configured to be arranged in connection to said first side, said elevation device comprising a bearing configuration for facilitating said elevation of said weapon about the elevation axis, said arrangement comprising an arc-shaped sector bearing device of said bearing configuration, said bearing device being arranged in connection to the front portion at said first side at a radial distance from said elevation axis so as to provide space for said feeding chute on said first side in connection to said elevation axis.

2. The arrangement of claim 1, wherein said sector bearing device comprises an arc-shaped groove and a set of rollers, wherein said set of rollers are configured to be arranged within said groove, said arc-shaped groove and set of rollers being arranged such that relative movement of said rollers and said groove are provided in connection to elevation movement.

3. The arrangement of claim 1, wherein said sector bearing device comprises a bearing housing with an arc-shaped groove, said bearing housing being configured to constitute a fixed portion of said elevation device, fixedly arranged relative to an elevation member of said elevation device, said elevation member providing said elevation movement, said sector bearing device further comprising a bearing member arranged at said elevation member in connection to said first side of the elevation device, and a set of rollers distributed along and attached to said bearing member, said bearing housing being arranged in connection to said bearing member such that said set of rollers fit within said arc-shaped groove and are allowed to move within said groove in connection to elevation movement.

4. The arrangement of claim 3, wherein said sector bearing device comprises a sealing arrangement comprising a sealing device arranged in connection to said arc-shaped groove and configured to face and be arranged against an outer side of said bearing member so as to provide low friction sealing between said bearing housing and bearing member and allow movement of said bearing member relative to said bearing housing in connection to elevation movement.

5. The arrangement of claim 4, wherein said sealing member is configured be received in a slot running along said arc-shaped groove, said sealing member comprising a compressible strip member arranged in the bottom of said slot providing a spring function, and a low friction sealing member configured to face and be arranged against said outer side of said bearing member with a first side for said low friction sealing, and configured to, with the opposite side, press against said compressible strip member so as to provide a compressed state for efficient sealing between said bearing housing and bearing member.

6. The arrangement of claim 3, wherein the elevation device with said arrangement is configured to be arranged within a turret of a vehicle mounted weapon system for which the arrangement is intended, the weapon system comprising the weapon mounted to a turret via the elevation device, the elevation device being fixedly mounted to said turret via said bearing housing.

7. The arrangement of claim 2, wherein said elevation device is configured to provide elevation of the weapon between a maximum elevation angle and minimum elevation angle, wherein said arc-shaped groove has an extension so as to allow movement of said set of rollers within said groove within a range between said maximum elevation angle and minimum elevation angle.

8. The arrangement of claim 2, wherein said arc-shaped groove has a rear wall portion with an inner side configured to face in the forward direction, and a front wall portion with an inner side configured to face in the rear direction, wherein said rear wall portion and front wall portion are arranged with a distance between said inner sides and are running parallel with an arc-shaped extension.

9. The arrangement according to of claim 8, wherein the distance between said inner sides of said rear wall portion and front wall portion is slightly larger than the diameter of the respective roller of said set of rollers configured to be distributed along and attached to said bearing member and received within said arc-shaped groove so as to allow rolling of said rollers against an inner side of said inner sides.

10. The arrangement of claim 8, wherein said set of rollers comprises recoil rollers configured to be arranged in connection to the inner side of said rear wall portion so as to take up recoil load of the weapon, and return rollers configured to be arranged in connection to the inner side of said front wall portion so as to take up return load of the weapon.

11. The arrangement of claim 5, wherein rollers configured to be arranged in connection to one of said inner sides of said arc-shaped groove are configured to be fixedly arranged with regard to the radial position and rollers configured to be arranged to the opposite inner side of said arc-shaped groove are adjustably arranged with regard to the radial position so as to facilitate providing a desirable clearance in rear and forward direction.

12. The arrangement of claim 11, wherein said sector bearing device comprises an adjustment arrangement arranged in connection to said bearing member so as to facilitate adjustment of said adjustably arranged rollers.

13. The arrangement of claim 12, wherein said adjustment arrangement comprises a set of adjustment tongues provided by recesses in said bearing member, said adjustably arranged rollers being configured to be attached to said adjustment tongues, said adjustment arrangement further comprising a set of screw joint members, wherein each screw joint member of said set of screw joint members is arranged in connection to an adjustment tongue of said set of adjustment tongues such that, by providing a screw force against that adjustment tongue, adjustment of said tongue is provided such that the radial position of the thus attached roller is moved closer to an inner side of said arc-shaped groove.

14. The arrangement of claim 13, wherein said set of adjustment tongues with said adjustable rollers are distributed along said bearing member in pairs facing each other, wherein said fixed rollers are configured to be attached at the end of pairs of adjustment tongues.

15. The arrangement of claim 13, wherein said set of adjustment tongues are shaped so as to facilitate providing an essentially equal stiffness of the sector bearing device in rear and forward direction.

16. The arrangement of claim 13, wherein said set of adjustment tongues comprises an attachment portion for attaching said adjustable roller and a base portion for said adjustment, wherein the thickness of said base portion is adapted so as to facilitate providing an essentially equal stiffness in rear and forward direction.

17. The arrangement of claim 8, wherein said recoil rollers, configured to be arranged in connection to the inner side of said rear wall portion of said arc-shaped groove, are configured to be fixedly arranged with regard to the radial position, and said return rollers, configured to be arranged in connection to the inner side of said front wall portion of said arc-shaped groove, are adjustably arranged with regard to the radial position so as to facilitate providing a desirable clearance in rear and forward direction.

18. A vehicle comprising an arrangement of an elevation device for a weapon system mounted on said vehicle of claim 1.

19. A vehicle of claim 18, wherein the vehicle is a tracked vehicle.

* * * * *